(12) United States Patent
Zaghloul (10) Patent No.: US 8,014,397 B1
(45) Date of Patent: Sep. 6, 2011

(54) CORRELATING PACKETS IN A DATA-COMMUNICATIONS ENVIRONMENT

(75) Inventor: Said Ismail Said Zaghloul, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 995 days.

(21) Appl. No.: 11/427,185

(22) Filed: Jun. 28, 2006

(51) Int. Cl.
*H04L 12/28* (2006.01)
*H04J 3/16* (2006.01)

(52) U.S. Cl. ......... 370/392; 370/389; 370/469; 709/231

(58) Field of Classification Search .......... 370/241–466, 370/469–474; 709/224–245
See application file for complete search history.

(56) References Cited

U.S. PATENT DOCUMENTS

| | | | |
|---|---|---|---|
| 5,995,506 A * | 11/1999 | Fujimori | 370/389 |
| 6,147,970 A * | 11/2000 | Troxel | 370/235 |
| 6,483,808 B1 * | 11/2002 | Rochberger et al. | 370/238 |
| 7,065,102 B1 * | 6/2006 | Petersen et al. | 370/469 |
| 7,088,726 B1 * | 8/2006 | Hamamoto et al. | 370/401 |
| 7,277,957 B2 * | 10/2007 | Rowley et al. | 709/231 |
| 7,372,848 B2 * | 5/2008 | Doerr et al. | 370/352 |
| 7,729,256 B2 * | 6/2010 | Malloy et al. | 370/235 |
| 2002/0133586 A1 * | 9/2002 | Shanklin et al. | 709/224 |
| 2007/0156916 A1 * | 7/2007 | Schiefer | 709/232 |
| 2009/0003383 A1 * | 1/2009 | Watanabe et al. | 370/474 |
| 2010/0091676 A1 * | 4/2010 | Moran et al. | 370/252 |

* cited by examiner

*Primary Examiner* — Man Phan (57) ABSTRACT

A method, system, and medium are provided for correlating and evaluating sets of packets in a networking communications environment even when the sets of packets are communicated in different protocols. One embodiment of the method includes providing a first set of packets sent from a source device, providing a first set of packet attributes that describe the packets, storing the first set of packet attributes, providing a second set of packets that are related to the first set of packets and that are to be received by a destination device, providing a second set of packet attributes that describe a first packet in the second set of packets, storing the second set of packet attributes, and determining which of the first set of packet attributes correspond to the second set of packet attributes.

15 Claims, 11 Drawing Sheets

```
DEFINE GROUP STREAMA AS SELECT * FROM RADIUS WHERE STREAM = "STREAMA"

DEFINE GROUP STREAMB AS SELECT * FROM RADIUS WHERE STREAM = "STREAMB"

DEFINE GROUP MATCHEDRECORDS AS MATCH GROUPS STREAMA, STREAMB WHERE
STREAMA.ID = STREAMB.ID AND STREAMA.CODE = STREAMB.CODE AND
STREAMA.USERNAME = STREAMB.USERNAME

CALCULATE DELAY_MATRIX AS DELAY(MATCHEDRECORDS, TIME) STORE INTO TABLE
TEMP_1

CALCULATE PDF(DELAY_MATRIX) STORE INTO TABLE TEMP_2
```
— 510

```
SELECT * FROM X WHERE (F1.FROM == F2.F == F3.FF) AND
              (F1.CORRELATION_ID == F2.CID == F3.CIDCID)
              ... [MORE CONSTRAINTS IF NEEDED]
```
— 512

CORRELATING PACKETS IN A DATA-COMMUNICATIONS ENVIRONMENT

BACKGROUND

To set up various types of data communications calls, several parameters often need to be negotiated over various protocols. Packets of data will be sent from various sources to destinations according to the various protocols. Call failures can be caused by latency and other forms of delays (e.g. lost packets, etc) throughout a packet based communications system. Inasmuch as providers desire to reduce call failures and other types of ailments associated with a communications network, it is desirous to be able to analyze packet streams and their corresponding attributes as they pass though one or more networks. But tracking packet streams as they are communicated from a first protocol to a second protocol (and so on) has been problematic. So too has been providing a way for multiple entities to access the packet-stream data, especially in a way that is scaleable and free from proprietary code and solutions.

SUMMARY

The presenting invention is defined by the claims below. Embodiments of the present invention solve at least the above problems by providing a system and method for, among other things, correlating packet streams even as they pass from being communicated in one protocol to another providing the opportunity to perform delay/performance analysis on data packets. The present invention has several practical applications in the technical arts including allowing for various packet streams of various protocols to be correctly correlated, exposing the gathered data to multiple entities who can work on the data simultaneously, providing a solution that is robustly scaleable and free of proprietary code, and ultimately allowing for the integrity of a communications network to be increased.

In a first aspect, a set of computer-useable instructions are provided to perform a method of correlating sets of packets in a communications networking environment The method includes providing a first set of packets sent from a source device, providing a first set of packet attributes that describe the packets, storing the first set of packet attributes, providing a second set of packets that are related to the first set of packets and that are to be received by a destination device, providing a second set of packet attributes that describe a first packet in the second set of packets, storing the second set of packet attributes, and determining which of the first set of packet attributes corresponds to the second set of packet attributes.

In another aspect, a similar method includes receiving a first set of packets communicated in a first protocol; receiving a second set of packets communicated in a second protocol, wherein the second protocol differs from the first protocol; storing a data set comprising attributes associated with the first set of packets, and attributes associated with the second set of packets; and submitting a query for data based on criteria that is common to both the first and second protocols.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for evaluating a performance of a communications network. Performance evaluation is facilitated by being able to analyze attributes of packet streams even when those packet streams are communicated using multiple protocols.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

In one embodiment, a service-oriented type of architecture is employed to enhance scalability and help facilitate packet evaluation. This allows service providers to utilize code developed by others to easily integrate it into the framework of an embodiment of the present invention. The framework described herein provides a generic way for various software components to interact harmoniously. Various file-importing modules as well as real-time sniffers can be utilized to support new formats and provide functionality.

Although real-time packet analysis offer advantages in certain settings, an embodiment of the present invention leverages off-line, packet-gathering techniques to store, analyze, and correlate various attributes of packet streams to determine useful metrics and other data. This data can be used to ultimately improve a communications network or for other purposes including research purposes and reducing the likelihood of component incompatibilities.

Often, a traffic pattern of session arrivals in a production network are not known; rather, only the maximums or averages are known. These metrics are used to simulate traffic using fixed distribution patterns. But real traffic does not arrive at a constant rate. It has a bursty nature. This aspect of burstiness is important to estimate buffer sizes at data-network elements for example. By knowing various traffic properties, designers will be able to provide quantitative and accurate requirements to both vendors and test engineers. This will allow a communications provider to provide its vendors with actual traffic patterns to be used in their tests, which will increase the likelihood that a vendor's products will be compatible with a provider's communications network.

Moreover, such accurate data can be utilized by technology researchers and strategists to study the network more closely and build accurate simulation models associated with the network. Historically, gathering packet-captures and analyzing packets associated with data communications has been subject to the experience of the gathering individual. For example, an engineer may need to compare and match packets exchanged between two servers. In the past, one will spend much time developing intricate code to obtain metrics such as the maximum mean and minimum delays. Moreover, the process of matching packets and analyzing them becomes almost impossible if packets are translated between different protocols. If one needed to evaluate the performance or to investigate a problem of call setup at various stages, manual packet matching would be almost impossible especially when a large number of packets is involved.

An embodiment of the present invention leverages database and web-services technologies, among others, to provide a generic framework that is flexible and scalable and has the ability to accept standard packet-capture files (or to receive data from real-time sniffing programs) or any other forms of data that the packet-stream attributes assume. Attributes of data packets are stored in the database, which can simultaneously be made available to multiple entities via interfaces such as web interfaces so that multiple people can examine data associated with a communications network simultaneously.

An embodiment of the present invention allows for the relating of packets from different capture files (or tables of data, etc.) over diverse sets of nodes and/or protocols, and can be used to derive packet-related statistics. Information gathered from the system and methods described herein will make the performance of cross-protocol communication analysis and interaction easier to study and evaluate. Product comparisons from various vendors can be carried out remotely and simply by deploying an embodiment of the present invention. In addition, an embodiment of the present invention can provide information that enables engineers to separate problems on various protocol layers and/or routing paths.

As previously mentioned, one of the advantages offered by the present invention is that data is stored in a repository that can be simultaneously accessed by multiple entities who can perform as much evaluation on the data in the datastore as desired. And because an embodiment of the present invention includes a database-based framework, it can be reinforced with data-mining technologies to allow researchers to discover hidden relationships among packet streams. This allows complex relationships to be derived between various groups of packets. For example, if one wanted to investigate the percentage of time that the delay between mobile IP-tunnel establishment and the first SIP/SDP-connection message over a chat application exceeds 5 seconds, such task can easily be accomplished via an embodiment of the present invention.

Figure 1:
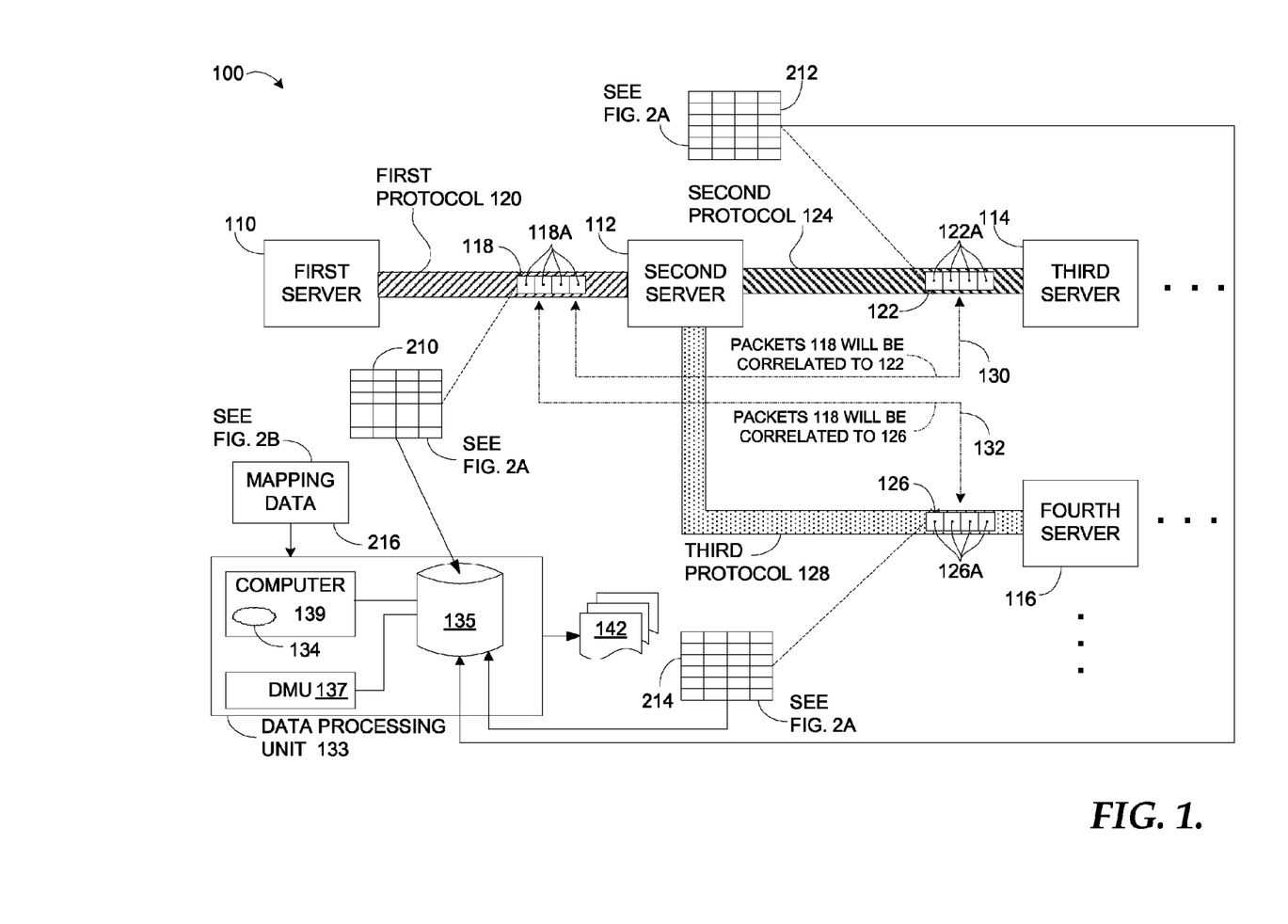
FIG. 1 is a combination diagram that depicts the communication of packet streams and storing of data relating to their attributes according to an embodiment of the present invention.

Turning now to FIG. 1, a combination diagram that illustrates an illustrative operating environment of the present invention is provided. The operating environment, which is generally referenced by the numeral 100, includes a first server 110, a second server 112, a third server 114, and a fourth server 116. Communication of a first set of packets 118 having a corresponding set of attributes 118A is communicated from first server 110 to second server 112 by a first protocol 120.

An illustrative second set of packets 122 having a corresponding set of attributes 122A is sent from second server 112 to third server 114 by a second protocol 124. Similarly, an illustrative third set of packets 126 having a set of a corresponding attributes 126A is communicated from second server 112 to fourth server 116 by third protocol 128. The various ellipses shown on FIG. 1 indicate that any number of servers communicating by way of any number of protocols is contemplated within the scope of the claims below, but are not shown so as to not obscure the present invention.

First-dotted line 130 indicates that packets 118 will be correlated to packets 122 even though packets 118 are of a different protocol than those of packets 122. It is likely the case that packets 122 communicate the same or similar information that would also be communicated by packets 118. They are translated into a different protocol for various reasons, but if there were no intervening second server 112 then packets 118 would be communicated directly to third server 114. Similarly, dotted line 132 indicates that packets 118 sent from first server 110 will be correlated to packets 126, which were sent from second server 112 bound for fourth server 116.

As will be explained in greater detail below, the respective attributes of packets 118A will be able to be compared to the attributes 122A and if desired to attributes 126A so that data can be gathered associated with the attributes. Illustrative desirable data may include a probability density function, time averages, standard deviations of roundtrip times, confidence intervals, and much more.

In an embodiment where attributed data is stored in a data store such as data store 135, any number of algorithms can be applied against the data to derive any desired metrics or to determine any sort of performance characteristics. A data mining unit 137 is shown coupled to data store 135. Data mining unit 137 can be, in some embodiments, a unit or module or set of computer usable instructions that mine the labyrinth of data stored in database 135. In some embodiments, this operation is carried out by a computer such as computer 139, which can be a separate computer or can be a computer that houses DMU 137 or even database 135 (which in some embodiments takes the form of a data-processing unit 133).

In some embodiments, an application 134 that takes the form of a set of computer usable instructions embodied on one or more computer-readable media associated with computer 139 facilitates various functional aspects as described in this disclosure. Illustrative aspects of application 134 include potentially taking the form of middleware logic such as web services or WSDL-defined services but can be any set of programmatic code that accomplishes the functionality described herein.

Data communications involve the communication of data packets, a lot of packets. The number of packets communicated may reach the order of tens of thousands, hundreds of thousands, millions, and beyond. In one embodiment, various attributes associated with a stream of packets are stored. In one embodiment, data is stored as capture files. In another embodiment it can be stored in tables. For example, attributes 118A of packet stream 118 can be stored in an illustrative table such as table 210, which is shown in greater detail in FIG. 2A.

Figure 2A:
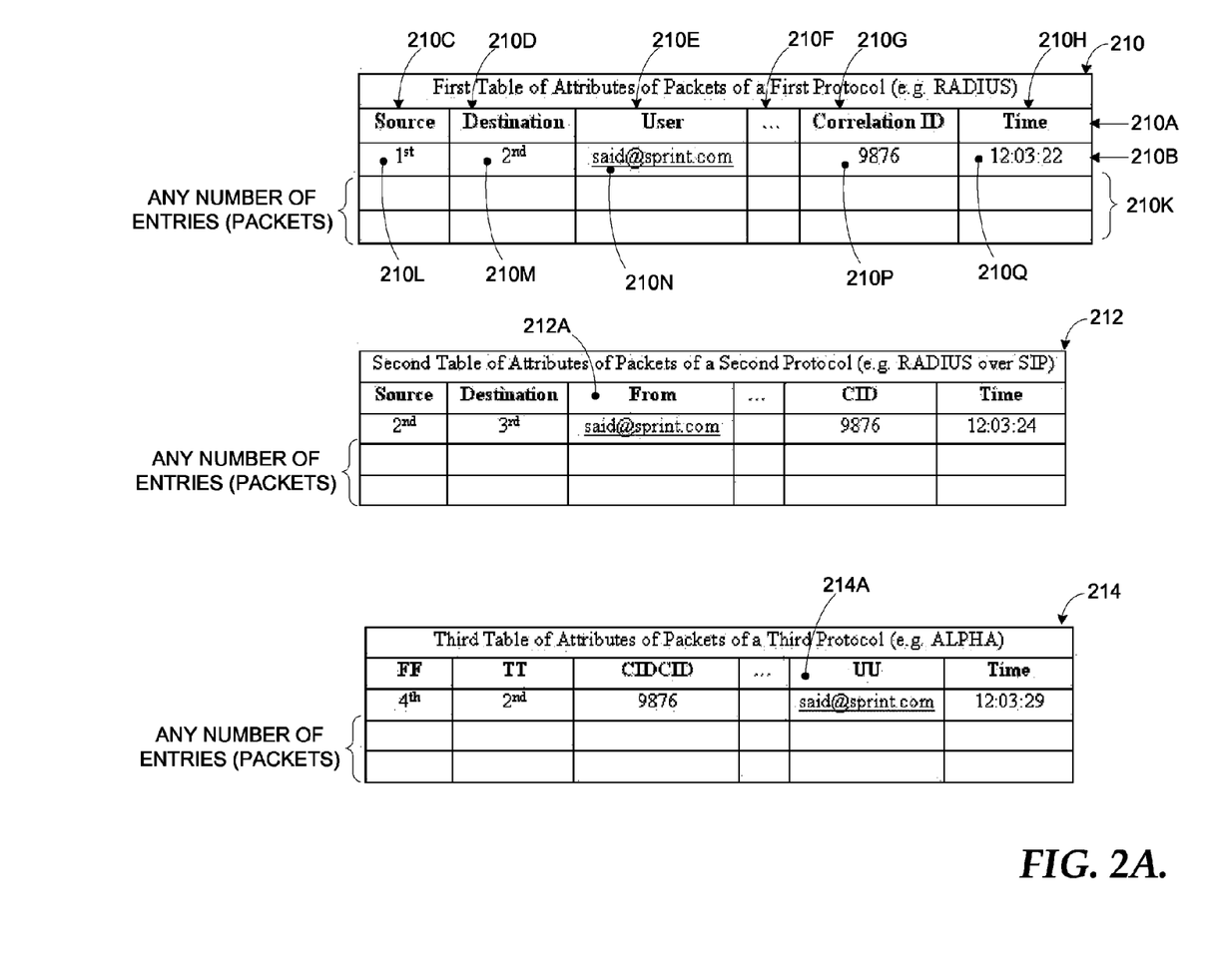
FIG. 2A depicts illustrative tables that store attributes of packet streams according to an embodiment of the present invention.

Similarly, attributes 122A of packet stream 122 can be stored in table 212, which is also shown in greater detail in FIG. 2A, as is table 214, which receives attributes 126A associated with packet stream 126. Although shown as different tables, in some embodiments, the data may be stored as one table or in some other arrangement such as a file. But to not obscure the present invention, an illustrative example is shown wherein the data is stored in respective tables which can be stored in database 135 in one embodiment. Again, the data stored in database 135 can be utilized to create various reports such as reports 142 that can be used for various purposes including network improvement and identifying unforeseen problems associated with the network.

Because the various protocols may refer to similar aspects of various packet streams in different forms, mapping data 142 can be utilized by application 134 to help facilitate the process of correlating the various packet streams to one another. Mapping data 142 will be explained in greater detail with reference to FIG. 2B.

Turning now to FIG. 2A, three illustrative tables 210, 212, and 214 are shown that represent one embodiment of storing various attributes associated with a stream of packets. Although the data is shown in tabular form, the data could also be represented in a text form, and the tables shown could take the form of data arranged in a file format or any other format that would convey the information shown in the illustrative tables. As shown, table 210 includes a header row 210A as well as one exemplary row 210B that contains data associated with the various fields of header row 210A. Header row 210A includes illustrative fields such as a "Source" field 210C, a "Destination" field 210D, a "user" field 210E," an ellipsis 210F representing the fact that any number of additional fields that represent any number of attributes associated with a stream of packets could also be included, a "correlation ID" field 210G, and a "time" field 210H. In this regard, the "Source" and "Destination" fields may be the IP layer addresses or even addresses showing on other layers. The choice of the names of the fields is for the sake of the example but not for limiting the scope of the invention. Similarly, the time field may represent the packet capture time (in some embodiments, the "Time" field maybe a protocol field). The packet could be inbound or outbound depending on the point on which it has been captured. The illustrative fields 210C-210H should not be construed as being required. They are not. But they do show illustrative fields that might be used to help correlate packets across different protocols (though not even all those shown need to be used).

As mentioned, row 210B includes illustrative data associated with fields 210C-210H. Any number of rows could be included, which is represented by numeral 210K. It may be the case that thousands, hundreds of thousands, or millions of data packets or streams of data packets are desired to be analyzed. If that is the case, then rows 210K would accommodate such numbers of packets. But as illustratively shown in row 210B, a packet stream such as packet stream 118 of FIG. 1 departs from first server 110 and is bound to second server 112, which is respectively indicated by boxes 210L and 210M.

In some embodiments, a user associated with sending packet stream 118 is identified via the data in box 210N, which is illustratively shown as "said @sprint.com. An illustrative correlation ID, shown in box 210P as "9876," can serve as a common identifier across protocols to help facilitate the correlation of packets as they transition either across servers or through different protocols.

An arbitrarily chosen time at which a packet stream such as packet stream 118 may have departed to its destination is shown in box 210Q as "12:03:22." Although there are various ways to track when a packet was sent to a destination, including absolute and relative time measurements, an illustrative format is shown, which indicates that packet stream 118 left first server 110 at 12:03:22. The time could be tracked more precisely if desired, and a date could also be included.

As packet stream 118 passes through second server 112, a different protocol may be employed to communicate the information stored in packet stream 118. For example, whereas first protocol 120 may have been used to communicate packet stream 118 from first server 110 to second server 112, second protocol 124 may be used to communicate the same data from second server 112 onto third server 114. But second protocol 124 may have different ways to refer to similar data as was referenced via first protocol 120. For example, whereas first protocol 120 may have indicated a field as "User" as seen in box 210E, second protocol 124 may indicate this field by "From," as indicated by box 212A.

Without cluttering the instant application with a variety of reference numerals, FIG. 2A illustrates that whereas first protocol 120 indicates a Correlation ID by reference to a "Correlation ID" field, second protocol 124 may reference the same data by a "CID" field and so on. The complexities at this point are further illustrated in view of third table 214.

With reference to table 214, it is shown that the order of the fields differs from the order of the fields in table 210. That is, whereas the field indicating the "User" field appeared as the third field in table 210, it may appears as the fifth field 214A in table 214. This differing order is another potential obstacle that would need to be overcome associated with correlating a first stream of packets and a first protocol with a second stream of packets and a second protocol. One way of resolving this issue is to employ mapping data, represented by 216 on FIG. 1, and illustrated in greater detail with reference to FIG. 2B.

Figure 2B:
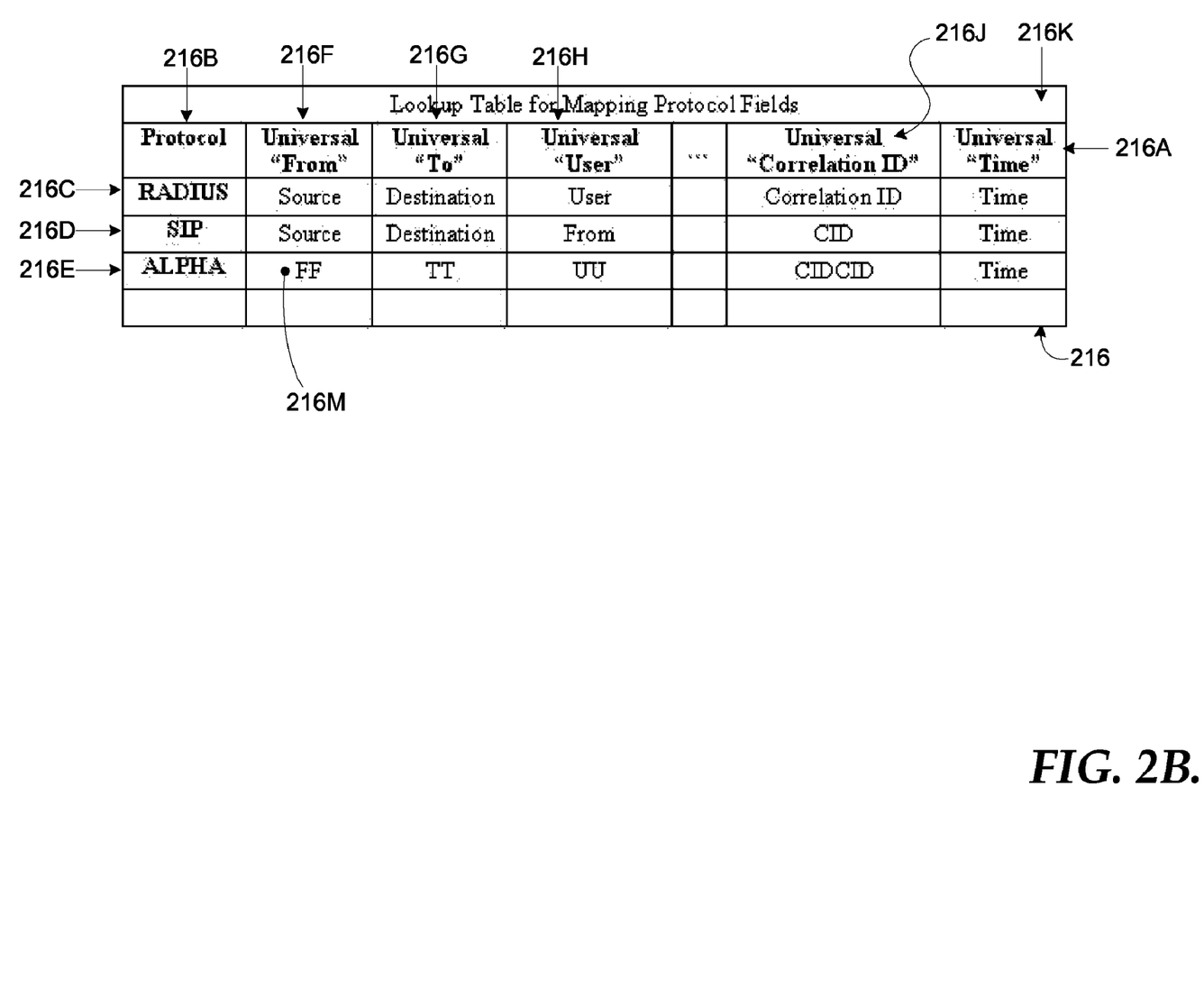
FIG. 2B depicts an illustrative form of mapping data that can be used to map aspects of various protocols to corresponding aspects of other protocols according to one embodiment of the present invention.

Turning now to FIG. 2B, illustrative mapping data is shown in tabular form and referenced by the numeral 216. Mapping data 216 may take a variety of forms in addition to the tabular form illustratively shown. For example, instead of employing a table, a file such as a criteria file may be employed that takes the form of a text file that includes computer code. This code may actually define various columns as well as defining how the various reference fields of a first protocol are associated to corresponding reference fields in a second protocol. This will be explained in greater detail below.

Returning to the illustrative embodiment shown in table 216, a header row 216A is used in connection with a protocol column 216B to map a set of fields in a certain protocol to a corresponding set of fields in another protocol. As illustratively shown, three protocol fields are mapped to each other. A first row 216C is associated with the radius protocol RADIUS. A second row 216D indicates purely illustrative field naming associated with the SIP protocol. And a third row 216E illustrates fields associated with a fictitious protocol referred to herein as "ALPHA," to indicate that any number of protocols could be used in connection with the present invention so long as the way that that protocol depicts data is mapped to the way that other protocols depict similar data.

It is worth reinforcing the illustrative nature of table 216. That is, header row 216A is shown to convey the concept that although there are various ways of describing the same thing, that same thing is derivable via mapping data 216. A course analogy can be drawn with respect to foreign languages. For example, one person may say "thank you." Another person may say "gracias." But both people are conveying thanks. The different foreign languages correspond to different protocols. And if one column had a heading "ways to express thanks" and then each row was populated with the way to convey a "thank you," then anyone interested in determining how to say thank you could do so by referencing that column in one or more rows.

Here, a general way to express the origin of a stream of packets is indicated by column 216F. Similarly, a universal way to express a destination of a packet stream will be stored in column 216G; a way to indicate a user is indicated in column 216H; a way to describe a correlation ID is provided in column 216J; and a way to describe the arrival or departure time of a stream of packets is provided in column 216K. Then, the cells of table 216 can be populated with data that allows the various fields of the various protocols to be mapped to each other.

For example, with reference to column 216F, if an entity was interested in determining how the ALPHA protocol describes an origin of a stream of packets, it could reference cell 216M to learn that the ALPHA protocol references an origin by an "FF" field. Thus, an application such as application 134 could then search the ALPHA protocol for the field corresponding to "FF" to determine a value in that field that would correspond to an origin associated with a stream of packets such as those shown in FIG. 1.

The data in table 216 allows the data in tables 210, 212 and 214 to all be cross-referenced with each other. Similarly, the data in table 216 allows a program such as data mining unit 137 or computer 139 to pluck the correct data associated with the respective attributes of various package streams with each other. It performs a sort of foreign-language translation. This allows packet streams to be correlated with each other. In this way, the departure time of packet stream 118 can be correlated to the departure time of packet stream 122 or 126 to determine whether there are any latency or other delays associated with transmitting a set of packets from first server 110 to third server 114 or fourth server 116.

Figure 3:
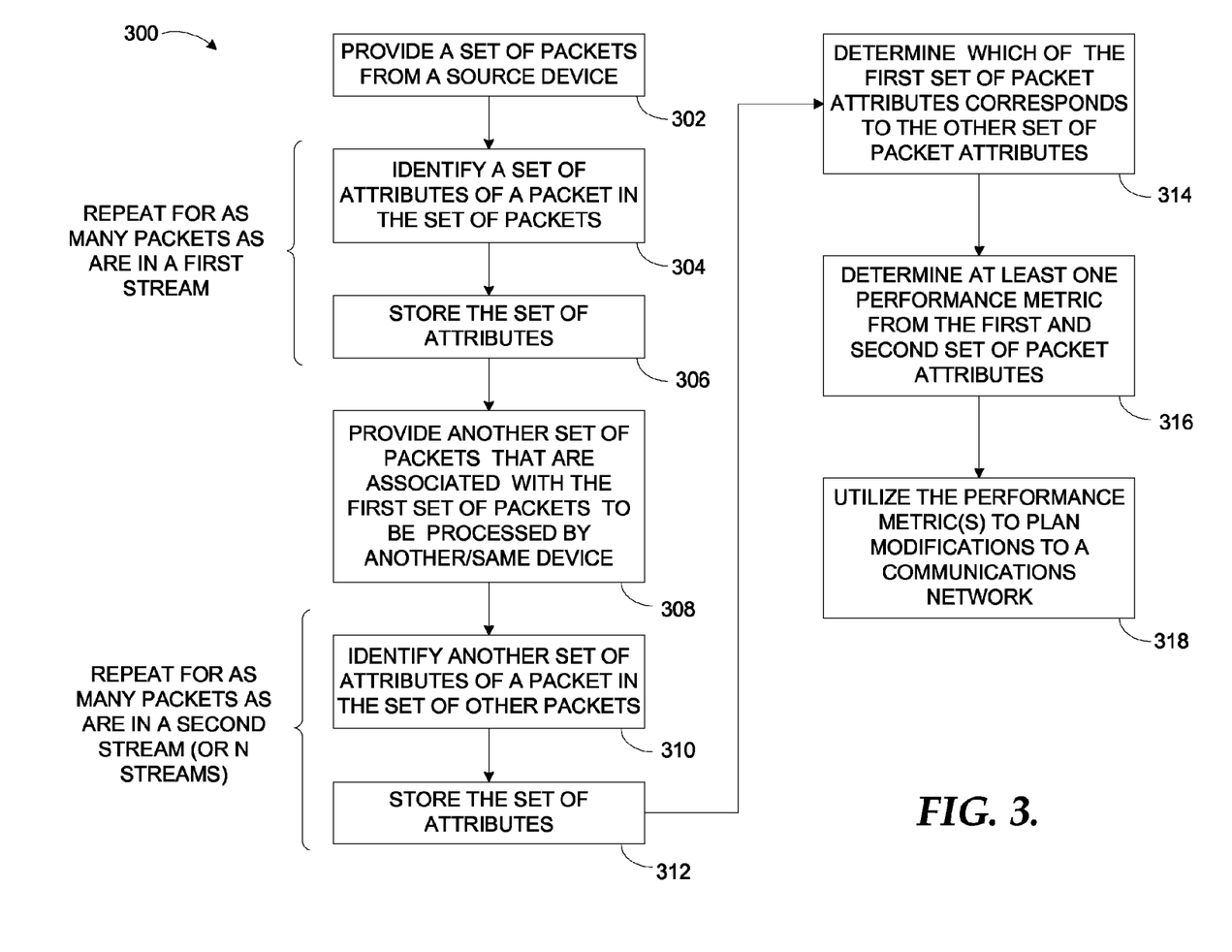
FIGS. 3 & 4 depict illustrative methods for correlating packet streams according to embodiments of the present invention.

An illustrative method associated with correlating packet streams and performing analysis on the same would now be provided beginning with reference to FIG. 3.

Turning now to FIG. 3, an illustrative embodiment of a method associating with the present invention is provided and referenced generally by the numeral 300. At a step 302, a set of packets is provided from the source device. With reference to FIG. 1, step 302 may take the form of providing packet stream 118 to be sent from first server 110. At a step 304, a set of attributes associated with a set of packets is identified. Thus, attributes 118A are identified as being associated with the packets in packet stream 118. These packets can be stored at a step 306.

In one embodiment, these packets can be stored in table 210, and ultimately in data store 135. In an alternative embodiment, attributes associated with the packets 118 may be stored directly in data store 135, which as previously mentioned may be a component of computer 139 or some other system. Steps 304 and 306 can be repeated for as many packets as are desired to be analyzed. This number may reach into the millions depending on the level and type of analysis that is to be carried out on the data stored in table 210 and/or database 135.

As the stream of packets is being communicated from first server 110 to second server 112, if their ultimate destination is beyond second server 112, then a set of corresponding packets, such as packet set 122 or packet set 126, will be respectively sent to first server 110 or to fourth server 116 for example (or to any of a number of servers, not shown). This process is represented by illustrative step 308, wherein another set of packets, such as packet set 122, are provided that are associated with the first set of packets 118 to be received by a destination device such as third server 114. And as previously mentioned, even though FIG. 1 illustratively shows four servers, the present invention can be practiced with any number of servers reaching into the hundreds or thousands.

At a step 310, the other set of attributes 122A associated with the second set of packets 122 are identified. The data associated with those attributes is stored at a step 312, for example in table 212. Again, steps 310 and 312 can be repeated for as many packets as are desired to be correlated with the first set of packets that were sent.

At a step 314, application 134 for example, determines which of the first set of packet attributes 118A corresponds to the other set of packet attributes 122A and one embodiment. This process has been previously described with reference to FIGS. 2A and 2B. In one embodiment a query can be made on one or more of the tables 210, 212, 214, and 216 to extract data that correctly corresponds to the respective fields of the various protocols. Utilizing a structure query language or some other form of querying syntax can be employed to extract the desired data from any number of applicable tables such as tables 210, 212, and 214.

Figure 5:
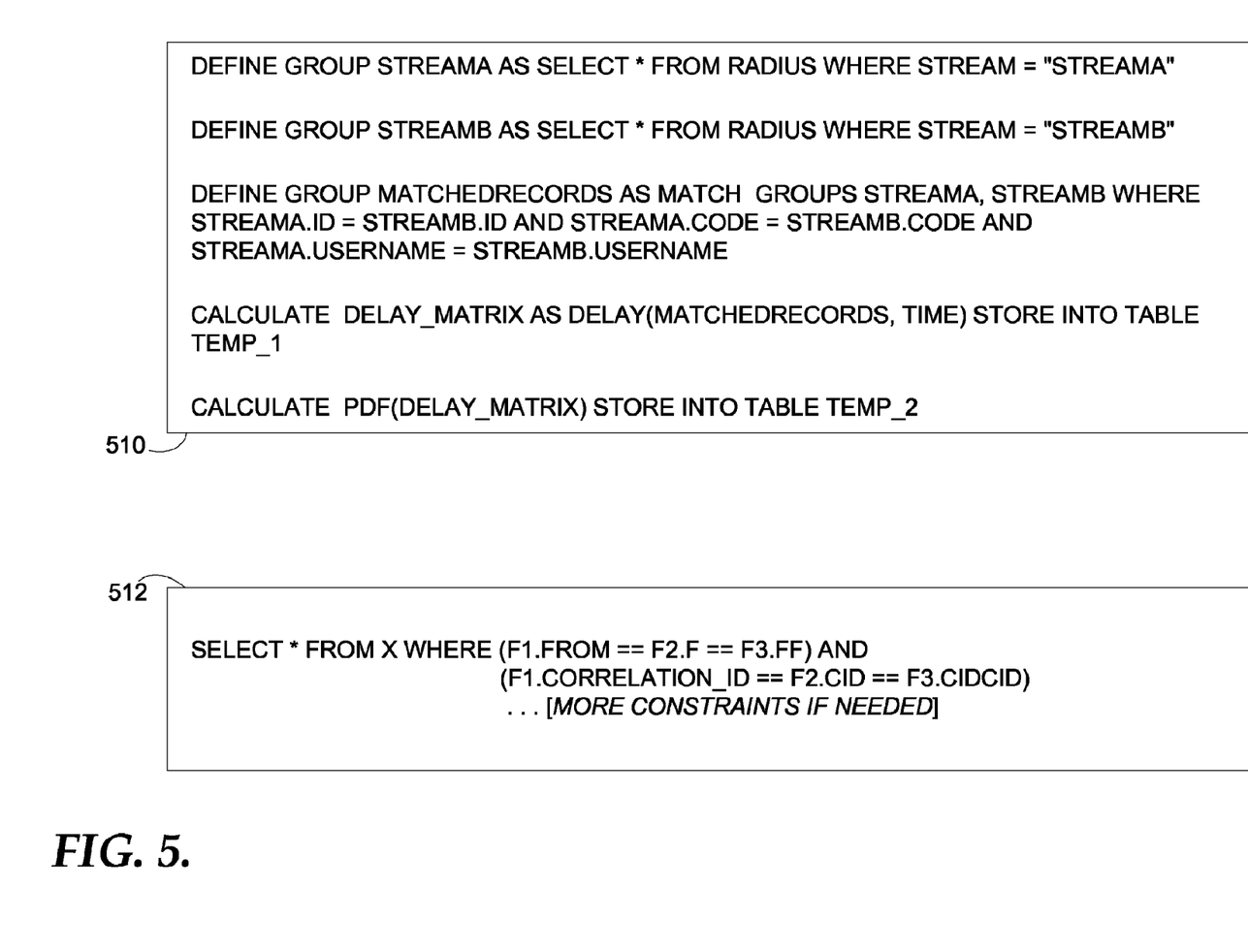
FIG. 5 depicts illustrative embodiments of searching for desired data that matches certain criteria according to an embodiment of the present invention.

Illustrations of aspects of correlating data (over the same protocol for simplicity) are shown in FIG. 5. Turning there briefly, illustrative pseudocode 510 illustrates merely one way of how data can be filtered so that the correct parts of various packet streams are associated with corresponding parts. That is, how a packet-origin indication in one protocol is evaluated against a packet-origin indication in another protocol and so on for as many protocols as are applicable. The illustrative pseudocode referenced by numeral 512 is not an actual query statement but is indicative of mapping and then searching on corresponding fields (e.g., the "From" field of protocol 120 corresponds to the "F" field of protocol 124 and to the "FF" field of protocol 128—see FIG. 2A). Many different ways exist to accomplish the tasks just mentioned, but these two are provided as illustrations.

Returning to FIG. 3, the process can also be continued to include a step 316, wherein at least one performance metric is determined from the first and second packet attributes. The limits here are almost boundless. A variety of performance metrics, evaluation criteria, or other attributes can be determined from the data extracted from the aforementioned tables or stored in data store 135. Illustrative metrics include roundtrip times, average packet transmission times, standard deviations of the averages, confidence intervals, probability density functions, and virtually any other form of statistics that an entity would desire. Moreover, the range of statistics can be increased by gathering additional attributes associated with the various packet streams.

As previously mentioned, the columns shown of tables 210, 212 and 214 are illustrative. In some embodiments, 20, 30, 40 or more columns of data can be gathered wherein each column corresponds to some other attribute associated with the packet stream. Other data may include an indication of intermediary servers that the packet stream passed through, the number of routers that the packet stream passed through, the amount of time spent passing through a router or some other data-communication component, the number of packets in a packet stream, the size of the packet stream, a target address associated with the packet streams such as an IP address, multiple billing or correlation IDs, etc.

This data can be used to modify/optimize the communications network or make other changes, as referenced by a step 318 in FIG. 3. Once the data is gathered, any number of people can access the data and use the data to complete a variety of functions. This analysis can be done offline, which allows the data to be accessed over and over again by as many interested parties as are applicable.

Figure 4:
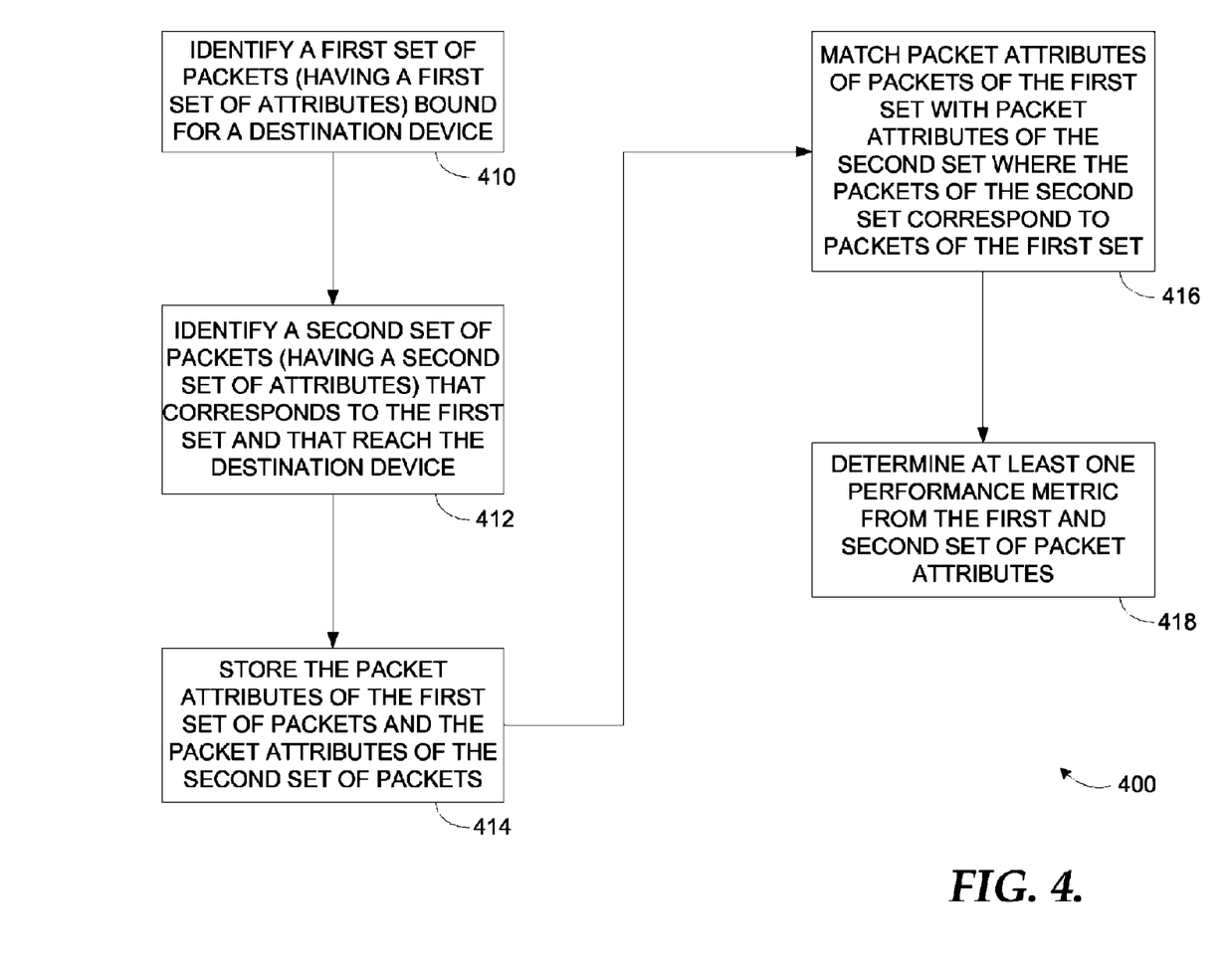

Turning now to FIG. 4, an alternative embodiment for implementing a method associated with the present invention is provided in reference generally by the numeral 400. At a step 410, a first set of packets having a first set of attributes is identified as being bound for a destination device. Again, this may take the form of identifying packet stream 118 as being communicated from first server 110 to a target destination such as either second server 112 or third server 114 or fourth server 116.

At a step 412, a second set of packets having a second set of attributes that correspond with the first set are identified, and that reach the destination device. Thus, packet stream 122 is identified because it is associated with packet stream 118 and it arrived at its ultimate target destination, third server 114. At a step 414, the packet attributes 118A of the first set and the packet attributes 122A of the second set are stored for future retrieval. Again, this could take the form a storing the data packets in the respective tables or directly in some other form of data storage 135.

At a step 416 the respective attributes 118A and 122A are matched as they correspond with each other. This matching may also occur across more than just two packet streams. As illustrated with reference to FIG. 2B, as many protocols as are mapped to each other, the same number of matchings can occur at step 416. At a step 418 a determination is made as to at least one performance metric associated with the first and second set of packet attributes, as previously mentioned.

And as previously described, as much data that is desired to be gathered can be gathered and stored in a data store, as much analysis as is desired can be performed on the data in an almost limitlessly scaleable environment without any need for proprietary software computer code. Rather, they can be extracted from the data store and any number of third-party analysis programs can be employed to analyze the data as described herein.

Having explained various embodiments of packet correlation and delay evaluation process with reference to the previous examples, we now present additional detail related to one embodiment of the correlation process. Note, "we" is employed to facilitate explanation, not to intimate multiple persons. In this embodiment, the correlation process runs over multiple streams of data to produce an outcome that facilitates collecting performance statistics, for example, inter-stream delay. The input streams could share the same protocol (or be replicas of each others in case of packet duplication servers used for push-to-x applications for instance).

Figure 6:
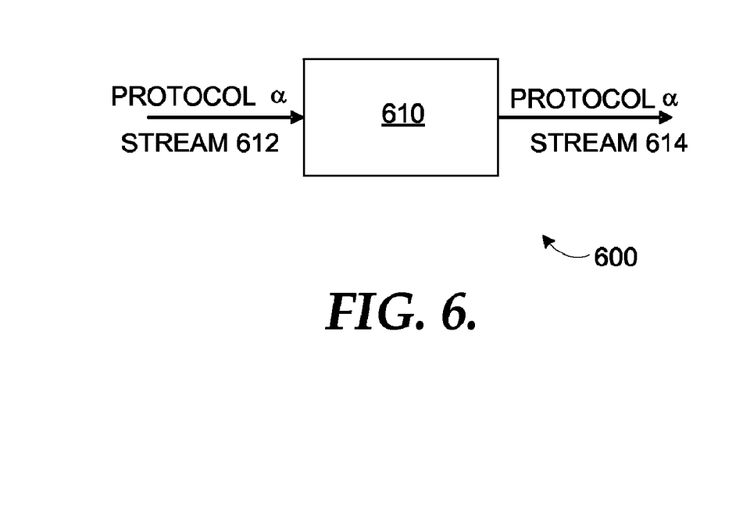
FIG. 6 depicts an illustrative example of a homogeneous protocol communication environment according to an embodiment of the present invention.

Turning now to FIG. 6, an illustrative example of a homogeneous protocol communication environment is provided and referenced generally by the numeral 600. FIG. 6 depicts a communication 610 with both an input stream 612 and an output stream 614. Streams 612 and 614 over the same protocol (protocol $\alpha$) in this example. A correlation operation may run on various categories of input streams with respect to their underlying communication protocols. The correlation process may run over multiple streams sharing the same protocol (homogenous correlation) or it may run over streams from different protocols (heterogeneous correlation).

Figure 7:
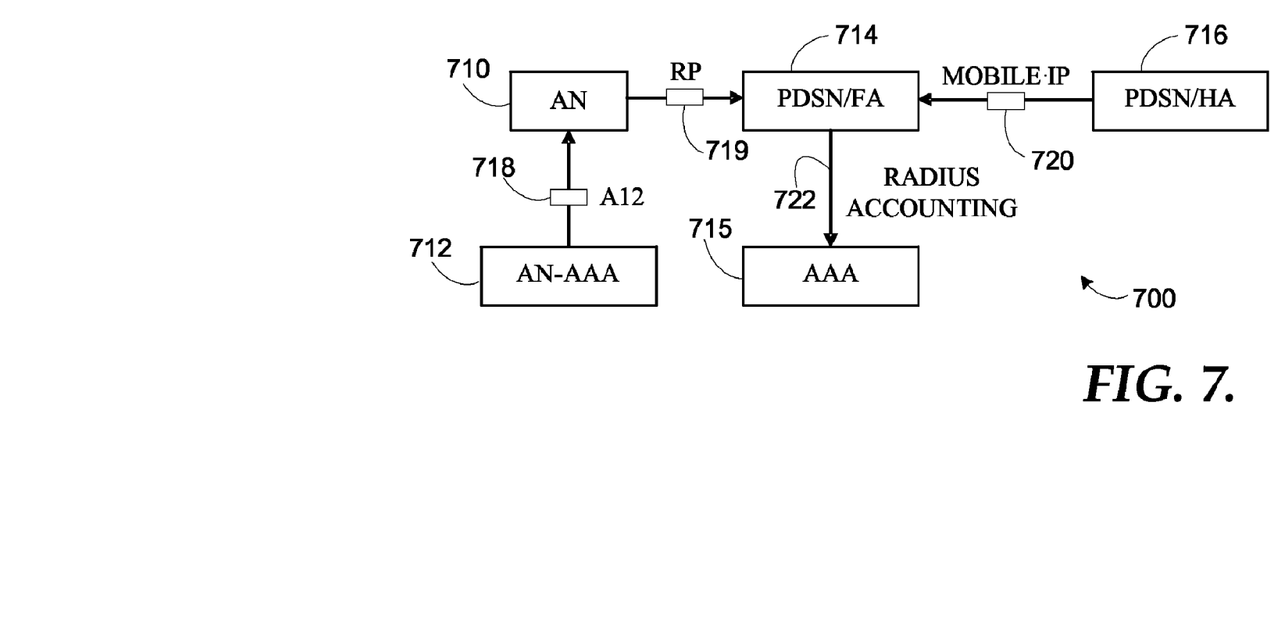
FIG. 7 depicts an illustrative, simplified example an embodiment of an EVDO (Evolution-Data Optimized) cellular mobile-IP (internet protocol) implementation according to an embodiment of the present invention.

FIG. 7 depicts an illustrative, simplified example of an embodiment of an EVDO (Evolution-Data Optimized) cellular mobile-IP (internet protocol) implementation. One way of setting up an EVDO data call includes communicating a subscriber's IMSI (International Mobile System Identifier) to a radio Access Network (AN) 710 by an Access Network Authentication, Authorization, and Accounting (AN-AAA) server 712. The IMSI along with the subscriber's device and radio related information such as its base-station identifier, the access terminal's electronic serial number (ESN), etc, are communicated over, say, the RP protocol 719 from the Access Network 710 to the Packet Data Serving Node/Foreign Agent (PDSN/FA) node 714, which is in communication with a Authentication, Authorization, and Accounting (AAA) server 715.

The subscriber's assigned IP address (referred to as the framed-IP-address) is communicated back from a Packet Data Serving Node/Home Agent (PDSN/HA) 716 to the PDSN/FA over the MobileIP protocol 720. Finally, the PDSN/FA 714 sends a RADIUS 722 (illustrative protocol) accounting packet that includes most of the previous information in one packet (i.e., IMSI, ESN, BaseStationID, framed-IP-address, etc), which identifies the subscriber's call parameter and starts an accounting process.

If the ultimate target was to evaluate delay difference between the RADIUS message and each one of the other protocol messages, then the correlation operation may use the RADIUS stream packets as a reference to calculate its relative delays with the other protocol messages. For example, it may have taken five hundred milliseconds after packet 718 was sent and fifty milliseconds after MobileIP packet 720 was received, all relative to the time the RADIUS message 722 was received by the AAA server (715).

In some cases one may be interested in the inter-packet delay of the same stream; for example, to evaluate jitter. In this regard, each packet from the same stream needs to be correlated with the packet captured after it within the same stream. In this case, the criterion for correlation is different from the previous cases. Here, the correlation rule is to get the next packet. For example, given a stream of packets (1, 2, 3, 4, . . . ), the correlation's process output is provided in tabular format:

TABLE 1

A Sample Auto-correlation Table

| CorrelatedStream1 | CorrelatedStream2 |
|---|---|
| Stream1, packet: 1 | Stream1, packet: 2 |
| Stream1, packet: 2 | Stream1, packet: 3 |
| Stream1, packet: 3 | Stream1, packet: 4 |
| Stream1, packet: 4 | Stream1, packet: 5 |
| Stream1, packet: 5 | Stream1, packet: 6 |

Where the correlation process operates on the same stream is referred to as an auto-correlation process. In summary, we define three major types of correlation operations: homogenous correlation, heterogeneous correlation, and auto-correlation.

Consider a stream of data packets by $S_p^n$ where p is an index of the protocol for the streams and n is the index for the stream within the same protocol. For example, in FIG. 6, Stream 612 is denoted herein as $S_1^1$ and Stream 614 is denoted as $S_1^2$ because they belong to the same protocol.

In FIG. 7, RADIUS Accounting (an illustrative protocol) is denoted by $S_1^1$, A12 (another illustrative protocol) 718 is $S_2^1$, RP (still another illustrative protocol) 719 is $S_3^1$, and MobileIP (still another illustrative protocol) 720 is $S_4^1$ because all streams belong to different protocols. Each stream i includes multiple packets $P_{i,j}^n$ where n is the index of the stream within the same protocol, i is the stream's protocol index, and j is the packet index within the stream. For example, $S_1^1 = \{P_{1,1}^1, P_{1,2}^1, P_{1,3}^1, \ldots\}$. In addition, each packet may include a group of messages (attributes) such that $P_{i,j} = \{M_{i,j,1}, M_{i,j,2}, M_{i,j,3}, \ldots\}$. In some embodiments, the correlation process takes a subset of the packet attributes.

As previously explained, the correlation process can use the Correlation-ID to identify the packets of interest. In such a situation, the Correlation-ID can be a distinguishing attribute $(\gamma_i)$ for the correlation process. Thus, packet messages $M_{i,j,k}$ may include a group made up of multiple distinguishing attributes of a data stream. This group is denoted by $\Lambda_p^n$ where p is an index of the protocol for the streams and n is the index for the stream within the same protocol. The distinguishing attributes' group forms at least a portion of the criteria used by an embodiment of the correlation process to identify packets to be correlated. Certain distinguishing attributes in $\Lambda_p^n$ would be matched to build a correlation table in one embodiment. Finally, a catchall condition $\Gamma$ defines the behavior for the correlation process if multiple entries are returned by the distinguishing set $\Lambda n_p^n$. These conditions could be as simple as {Take first result, Take the first result based on time, etc}.

We'll define the dictionary transform operation $D_{i,j}$ as an operation that transforms protocol messages from one protocol (protocol i) into another (protocol j). For example, one can define that the field x="start" in protocol i is equal to the field y="hello" in protocol j. Thus, if we apply the dictionary transform $D_{i,j}$ on packets from stream j as $D_{j,i}\{S_j\}$, then the result should be equivalent to $S_i$ because all (or just distinguishing) attributes in the dictionary will be translated from protocol j to protocol i, as previously explained. The dictionary translates the field names as well as their values. For example in the preceding example, $D_{j,i}\{y="hello"\}=\{x="start"\}$. The dictionary operation is a wide operation, not limited to a mere simple static translation. Dynamic dictionaries can be used as well. For example, a dictionary may be a regular expression to take the first two letters from a protocol field and put it into another one, For example, $D_{j,i}\{y="hello"\}=\{x="he"\}$ based on this dictionary transform. In another embodiment, the dictionary maybe formed of another stream. For example, a Domain Name System (DNS) query reply maybe used as dictionary rule to relate protocols using hostnames in the source field versus others using IP addresses.

In the following discussion, we will elaborate on the details of the aforementioned three correlation scenarios.

Homogenous Correlation

Figure 8:
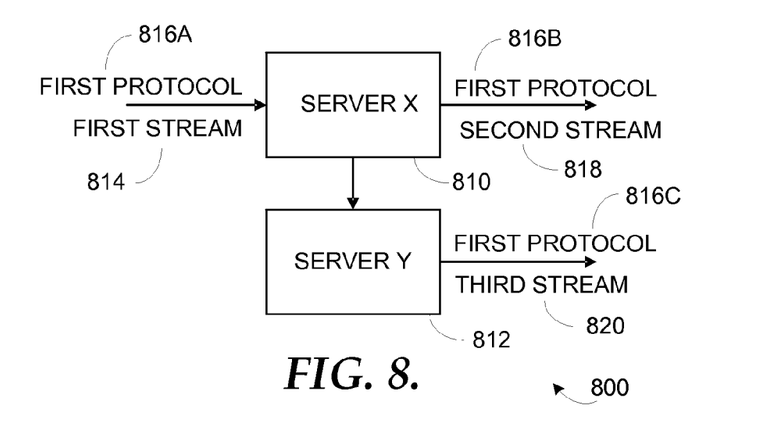
FIG. 8 depicts a homogeneous-correlation example according to an embodiment of the present invention.

All streams of interest for the communication in FIG. 8 use first protocol 816A. So in this case we have three streams denoted as $S_1^1$ (first stream 814), $S_1^2$ (second stream 818), and $S_1^3$ (third stream 820). Notice that we used a protocol index of 1 for all of the streams (the common protocol being denoted as 816A, 816B, 816C).

To calculate the delay among first stream 814, second stream 818, and third stream 820 between servers 810 and 812 relative to first stream 814, assume that we only need the ID, User-Name fields to uniquely identify packets to be correlated. Then the distinguishing attributes set $\Lambda_1^n$ is:

$$\Lambda_1^n = \{\gamma_1, \gamma_2\} \text{ where } \gamma_1 = ID \text{ and } \gamma_2 = \text{User-Name} \quad (1)$$

Thus, homogeneous correlation operation denoted by H is applied as follows:

$$\text{result} = H = [S_1^1, (S_1^2, \Lambda_1^2, \Gamma_1^2), (S_1^3, \Lambda_1^3, \Gamma_1^3)] \quad (2)$$

In equation (2), $S_1^1$ is the reference stream, and $(S_1^2, \Lambda_1^2)$ is the stream to correlate with as well as the set of mutual distinguishing attributes to use for correlation with $S_1^1$. $\Gamma_1^2$ and $\Gamma_1^3$ instruct the correlation process on how to handle the records in case multiple records show in the result set. Here, the correlation operation will be matching the conditions dictated by $\Lambda_1^2$ as:

$$(S_1^1 \cdot \gamma_0 = S_1^2 \cdot \gamma_0) \text{ AND } (S_1^1 \cdot \gamma_2 = S_1^2 \cdot \gamma_2) \quad (3)$$

Or generically:

$$\prod_{\forall \gamma_i \in \Lambda_1^k} [S_1^R \cdot \gamma_i == S_1^k \cdot \gamma_i]$$

where R is the index of the reference stream

The same applies to $(S_1^3, \Lambda_1^3)$. Notice that the result in equation (2) will be a table/matrix of the corresponding packets as shown in Table 2:

TABLE 2

A Sample Homogeneous Correlation Result

| Correlated first stream 814 [Reference Stream] | Correlated second stream 818 | Correlated third stream 820 |
|---|---|---|
| first stream 814, packet: 1 | second stream 818, packet: 2 | third stream 820, packet: 4 |
| first stream 814, packet: 2 | second stream 818, packet: 3 | third stream 820, packet: 2 |
| first stream 814, packet: 3 | second stream 818, packet: 4 | third stream 820, packet: 1 |
| first stream 814, packet: 4 | second stream 818, packet: 5 | third stream 820, packet: 5 |
| first stream 814, packet: 5 | second stream 818, packet: 6 | third stream 820, packet: 6 |

Although in this illustrative example the groups of distinguishing attributes $(\Lambda_1^2, \Lambda_1^3)$ were the same and equal to $\Lambda_1^n$ (see equation 1), they may be different. The correlation operation will still be homogeneous as long as the protocol is the same throughout all streams. Dictionary transforms are not used with this type of correlation, as all streams belong to the same protocol. Delay or other performance metrics can be calculated based on the correlation results table. For example, delay results for the first row in the correlation table can be calculated as, TimeDifference$\{P_{1,1}^{1},P_{1,2}^{2}\}$ for the delay between first stream 814 and second stream 818 packets, TimeDifference$\{P_{1,1}^{1},P_{1,4}^{3}\}$ for the delay between first stream 814 and third stream 820 packets, and TimeDifference$\{P_{1,2}^{2},P_{1,4}^{3}\}$ for the delay between second stream 818 and third stream 820.

Heterogeneous Correlation

Figure 9:
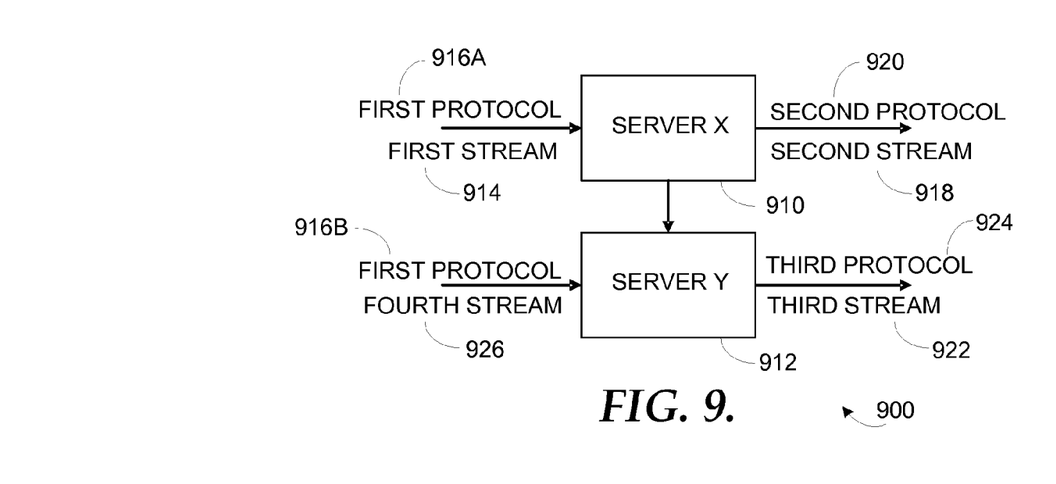
FIG. 9 illustrates a heterogeneous correlation example according to an embodiment of the present invention.

FIG. 9 illustrates a heterogeneous correlation example 900 with four streams (914, 918, 922, 926) with three different protocols (first protocol 916A & B, second protocol 920, third protocol 924). So in this case we have the four streams associated with servers 910 and 912 denoted as: first stream 914: $S_1^1$, second stream 918: $S_2^1$, third stream 922: $S_3^1$, and fourth stream 926: $S_1^2$.

Let us refer to the heterogeneous correlation operation by $\Re$. Assume that $S_1^1$ (916A) is the reference stream and that there exists a dictionary transform that translates all distinguishing attributes for both the second protocol 920 and the third protocol 924 back to the first protocol 916A. $\Re$ can be expressed as:

$$\text{Result} = \Re[S_1^1, (S_2^1, \Lambda_2^1, D_{2,1}, \Gamma_2^1), (S_3^1, \Lambda_3^1, D_{3,1}, \Gamma_3^1), (S_1^2, \Lambda_1^2, \Phi, \Gamma_1^2)] \quad (5)$$

Where $\Phi$ indicates that there is no need for a dictionary to be applied for the fourth stream 926 because it shares the same protocol with the reference stream (first stream 914).

Figure 10:
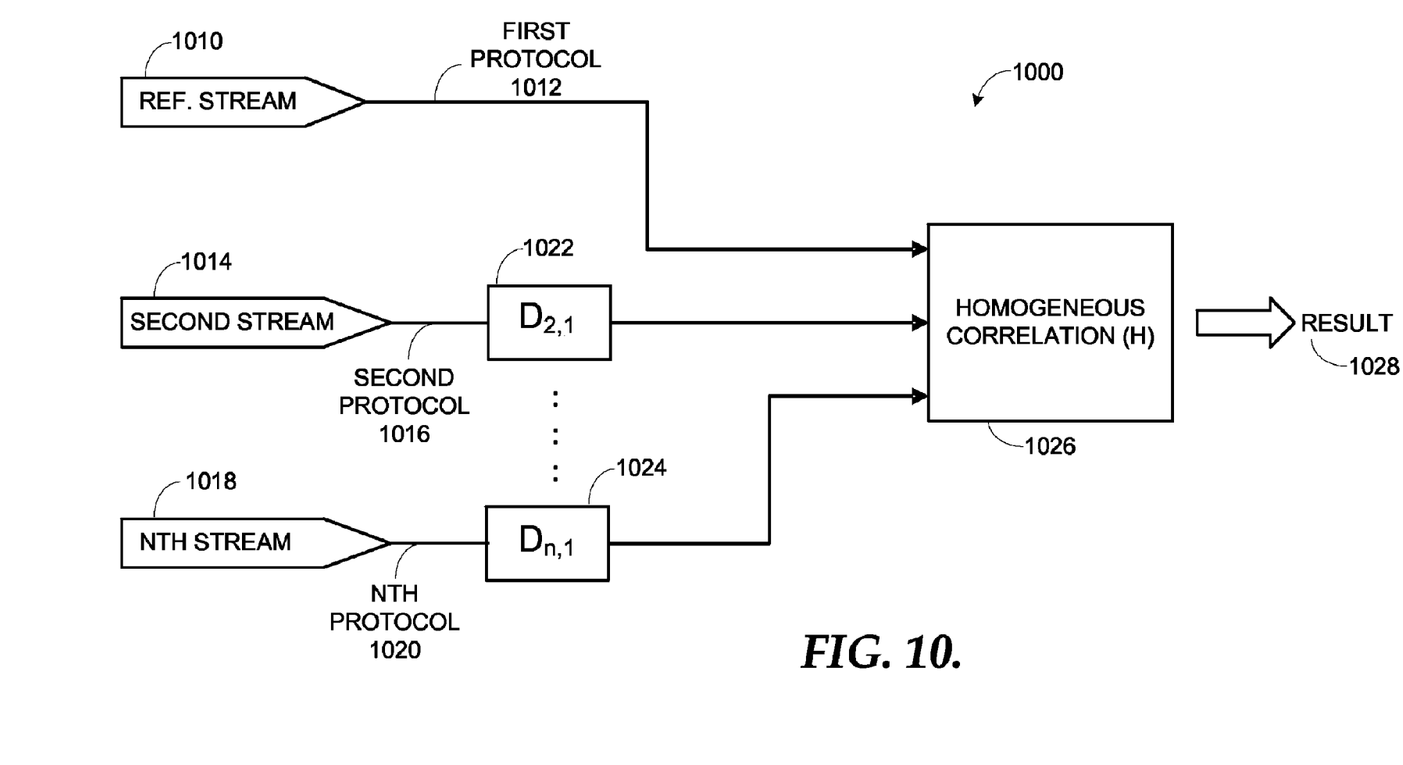
FIG. 10 depicts a representation of the heterogeneous correlation with dictionary transforms according to an embodiment of the present invention.

The dictionary transform 1022 and 1024 (see FIG. 10) can be used to translate the distinguishing attributes back to the reference protocol notation in this embodiment. The heterogeneous correlation operation 1026 may be represented by a homogeneous correlation operation supported by dictionary transforms as shown in FIG. 10 among streams 1010, 1014, and 1018).

Autocorrelation and the Packet Shift Operator

The autocorrelation operation is similar to the homogeneous correlation process in that it can be applied to the same protocol. As previously explained, the autocorrelation process correlates packets within the same stream with each other; for example to derive jitter statistics. In this case, we define the special operator $\psi$1114 (with reference to FIG. 11) as a stream replicator of reference stream 1110 with a shift of k packets. Autocorrelation is defined as a correlation operation carried on the same packet stream with a shift of k packets. The stream can be correlated with multiple replica with various shifts. Consider the following example with continued reference to FIG. 11.

Example 1

Jitter Calculation for a Packet Stream

Figure 11:
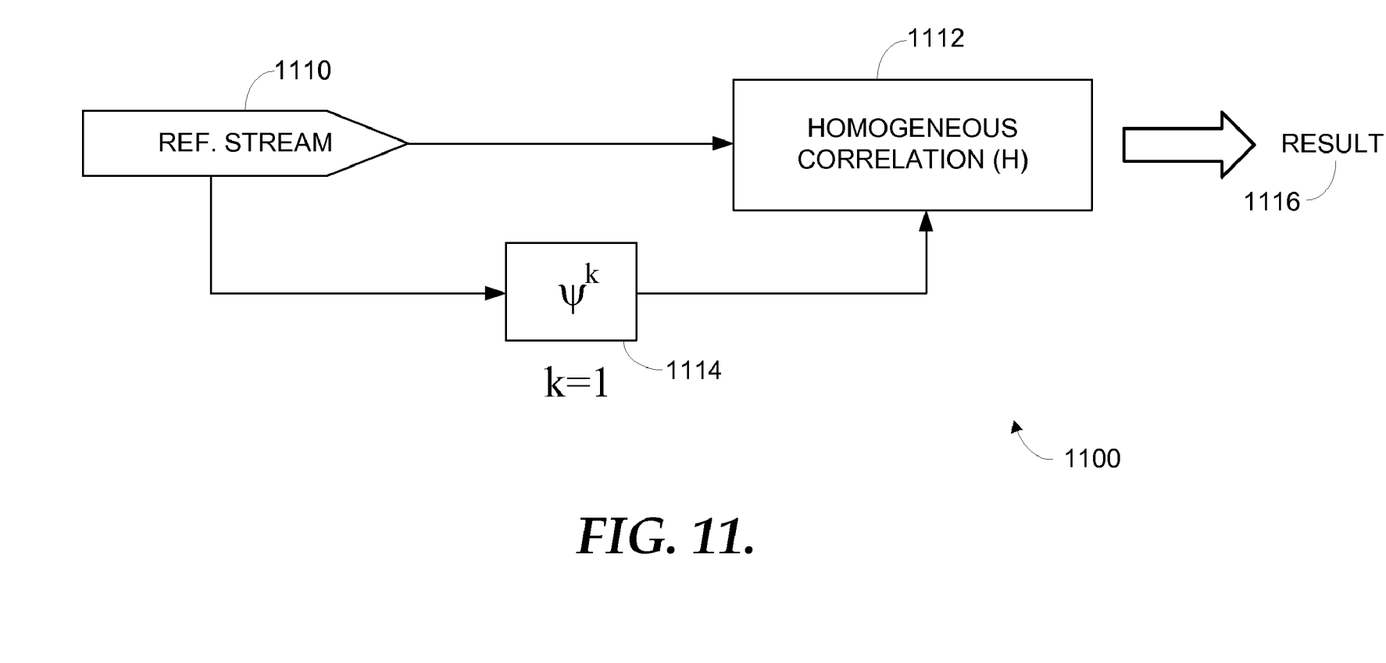
FIG. 11 represents a block diagram associated with an autocorrelator that facilitates calculating jitter statistics according to an embodiment of the present invention.

In this example, packets from the reference stream 1110 are shifted by one and correlated with their shifted replica. The correlation result 1116 is identical to the results shown in Table 1 via the correlation process 1112. The distinguishing attributes group $(\Lambda_1^1)$ is set to the empty group $\Phi$. In this case the correlation is as follows: the first packet from the original stream will be matched to the first packet from the shifted replica. The shifted replica is treated as if it is a totally different stream in this embodiment.

Example 2

Jitter Calculation for a User Session in a Packet Stream

Suppose that a RADIUS authentication stream enters a RADIUS server and we would like to be able to obtain the inter-arrival time of the user sessions (e.g., if user1@domain.com is authenticated, then user2@domain.com, afterwards user100@domain.com, and then user1@domain.com is authenticated again). We want to know the average time difference between successive authentications of the same user request (for example for user1@domain.com), then the autocorrelator in FIG. 11 can be used with the modification that the distinguishing attributes group $(\Lambda_1^1)$ should be set to the User-Name attribute rather than to the empty set. In this case the shift will guarantee that the record will not be matched with itself. A catch-all condition $\Gamma$ should be specified that takes the first packet that appears out of the multi-record result-set when multiple entries are returned.

Figure 12:
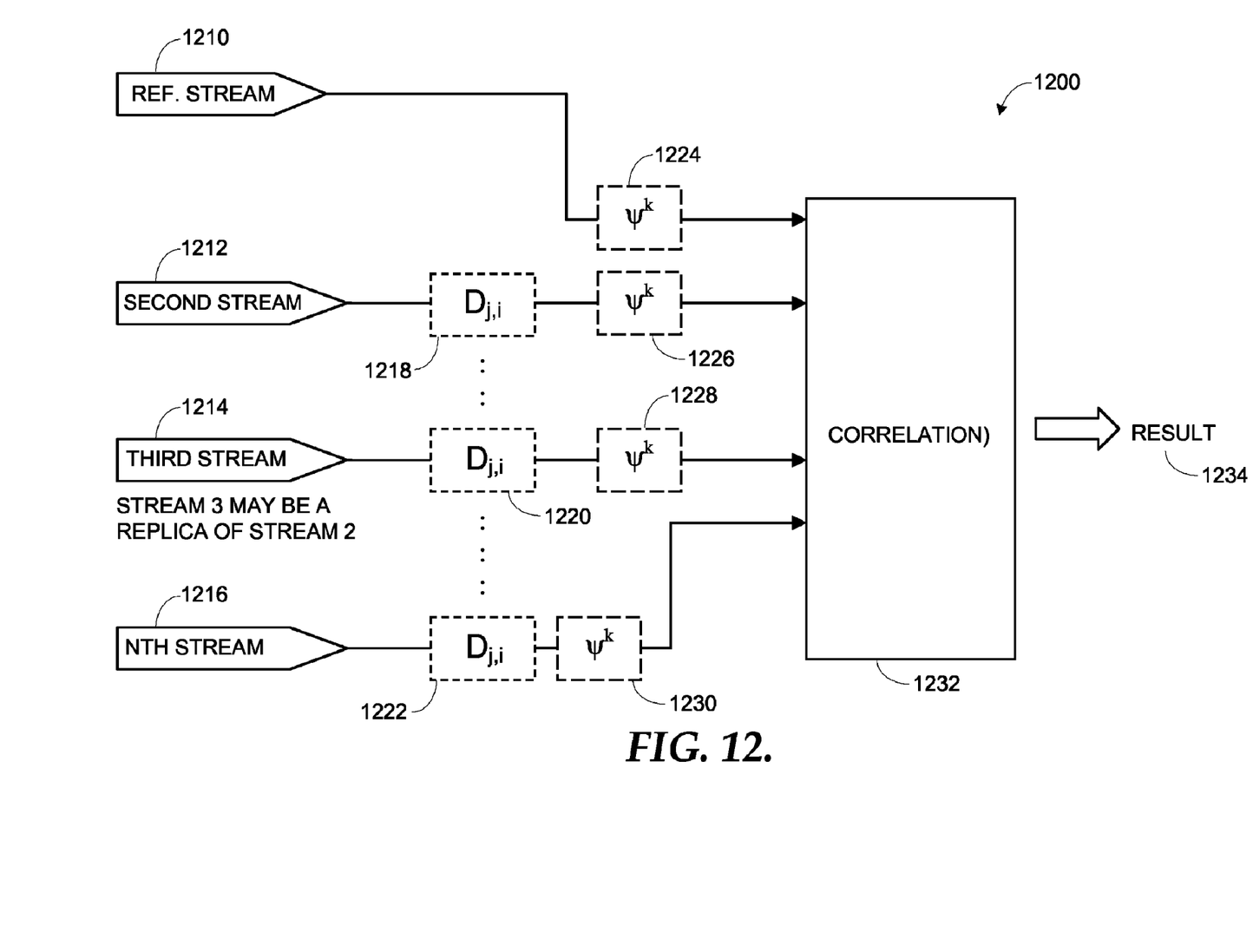
FIG. 12 depicts an illustrative generic correlator architecture (GCA) according to an embodiment of the present invention.

After considering the three types of correlation and their design, we combine the three types of the correlation processes into the Generic Correlator Architecture (GCA) capable to create correlation results for a vast set of applications. Turning now to FIG. 12, the streams 1210, 1212, 1214, and 1216 may belong to the same protocol, to different protocols, or even be replicas of each other. The dictionary transforms 1218, 1220, and 1222 are applied in case the streams have different protocols from the reference stream 1210. The shift operators 1224, 1226, 1228, and 1230 are used to shift packet streams. The GCA collapses into the homogeneous correlator if k=0 for the shift operator $\psi$, and a dictionary transform of type $\Phi$ is used provided that all input streams belong to the same protocol. The heterogeneous correlator is obtained if we remove all shift operators (k=0 for the shift operator $\psi$) from the GCA. Finally, we get the autocorrelator by removing the dictionary transforms provided that all input streams are replica of to the reference stream. It is also obvious that other combinations of correlation operations maybe derived from the GCA presented in FIG. 12.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable media having computer-useable instructions embodied thereon for performing a method of correlating sets of packets in a communications networking environment, the method comprising:
   providing a first set of packets sent from a source device,
      wherein the first set of packets includes communications call data;

providing a first set of packet attributes that describe a first packet in the first set of packets;

storing the first set of packet attributes in one or more databases that are simultaneously accessible to multiple parties;

providing a second set of packets that are associated with the first set of packets and that are to be received by a destination device, wherein the second set of packets includes the communications call data that is included in the first set of packets;

providing a second set of packet attributes that describe a first packet in the second set of packets;

storing the second set of packet attributes in the one or more databases that are simultaneously accessible to multiple parties; and determining which of the first set of packet attributes corresponds to the second set of packet attributes, wherein the determining occurs offline in other than real time, wherein the determining includes submitting a query to be applied against the first and second set of attributes stored in the one or more databases, and wherein the query filters based on criteria that include one or more of a packet identifier, a user name, a correlation identifier, or an address indication to correlate the first set of packet attributes with the second set of packet attributes.

2. The media of claim 1, wherein providing the first set of packets includes receiving copies of packets that are sent in the ordinary course of network communications.

3. The media of claim 1, wherein providing a first set of packet attributes occurs by virtue of providing the first set of packets.

4. The media of claim 3, wherein the first set of packet attributes includes one or more of:
an identifier;
a timestamp, the timestamp including one or more of an indication indicating when a packet was sent or received;
a protocol designation;
an origin indication;
a destination indication; and
a type, wherein the type indicates a type of packet or packet stream.

5. The media of claim 1, wherein the second set of packets includes packets communicated in a protocol differing from that in which the first set of packets was communicated.

6. The media of claim 5, wherein the second set of packets includes one or more of:
forwarded packets;
regenerated packets; or
packets that are generated in response to receiving the first set of packets.

7. The media of claim 1, wherein providing a the second set of packets that are associated with the first set of packets and that are to be received by a the destination device includes providing packets that are known to have been received by the destination device.

8. The media of claim 1, wherein the second set of packet attributes includes one or more of a type of attributes of the first set of attributes.

9. The media of claim 1, further comprising determining at least one performance metric from the first and second set of packet attributes.

10. The media of claim 9, wherein the at least one performance metric includes one or more of an average delay, a minimum delay, a maximum delay, a probability density function, or cumulative distribution function.

11. The media of claim 9, further comprising utilizing the at least one performance metric to plan modifications to the communications network.

12. One or more tangible computer-readable media having computer-useable instructions embodied thereon for performing a method of correlating packet streams in a communications network, the method comprising:
receiving a first set of packets communicated in a first protocol;
receiving a second set of packets communicated in a second protocol, wherein the second protocol differs from the first protocol;
storing a data set comprising attributes associated with the first set of packets and attributes associated with the second set of packets;
querying a table for data based on criteria that is common to both the first and second protocols; and
receiving any number of additional sets of packets, and querying the table for data based on criteria that is common to any number of respective protocols.

13. One or more tangible computer-readable media having computer-useable instructions embodied thereon for performing a method of correlating sets of packets in a communications networking environment, the method comprising:
identifying a first set of packets ("first packets") that includes communications call data bound for a destination device, the first packets having a first set of attributes, wherein the first packets are communicated by a source device in a first communication protocol, and wherein the attributes in the first set of attributes are formatted according to the first communication protocol;
identifying a second set of packets ("second packets") that reach the destination device and that corresponds to the first set of packets having been communicated by an intermediate device in a second communication protocol, the second packets having a second set of attributes, wherein the attributes in the second set of attributes are formatted according to the second communication protocol, and wherein the second packets include the communications call data that is included in the first packets;
storing a portion of the first set of attributes and a portion of the second set of attributes in a data store;
matching attributes from the first set of attributes with attributes from the second set of attributes to determine individual packets of the second set of packets that correspond to individual packets of the first set of packets, wherein corresponding packets include the same communications call data; and
determining at least one performance metric from the first and second set of packet attributes.

14. The media of claim 13, wherein the second communication protocol is the same as the first communication protocol.

15. The media of claim 13, wherein the second communication protocol is different than the first communication protocol, wherein matching the attributes from the first set of attributes with the attributes of the second set of attributes includes accessing a stored mapping that identifies which attributes formatted according to the second protocol correspond to the same or similar attributes formatted according to the first communication protocol.

* * * * *